United States Patent
Dubovsky et al.

[11] 3,832,563
[45] Aug. 27, 1974

[54] APPARATUS FOR STORING AND PROCESSING FISSIONABLE SUBSTANCES

[76] Inventors: Boris Grigorievich Dubovsky, Kaluzhskoi oblasti, Sportivnaya, 5, kv. 6; Viktor Konstantinovich Bogatyrev, Kaluzhskoi oblasti, bulvar Entuziastov, 27, kv. 52; German Matveevich Vladykov, Kaluzhskoi oblasti, ulitsa Kosmonavtov, 7a, kv. 23; Valentina Yakovlevna Sviridenko, Kaluzhskoi oblasti, 44, kv. 71 ulitsa Lenina, all of Obninsk, U.S.S.R.

[22] Filed: Aug. 7, 1972

[21] Appl. No.: 278,655

[52] U.S. Cl.................. 250/506, 250/507, 250/518
[51] Int. Cl. ............................................. G21f 1/00
[58] Field of Search ......... 250/108 R, 84.5, 108 FS, 250/108 WS, 506, 507, 518

[56] References Cited
UNITED STATES PATENTS
3,005,105 10/1961 Lusk ............................. 250/108 R
3,111,586 11/1963 Rogers ........................... 250/108 R
3,659,106 4/1972 Cason ............................ 250/108 R

*Primary Examiner*—James W. Lawrence
*Assistant Examiner*—Davis L. Willis
*Attorney, Agent, or Firm*—Waters, Roditi, Schwartz & Nissen

[57] ABSTRACT

An apparatus for storing and processing fissionable substances provided with a protective shield. The latter consists of a layer of a neutron-absorbing material, followed by a layer of a neutron-retarding material. The layer of a neutron-absorbing material is located in a direct proximity to a vessel with a fissionable substance contained therein. The layer of a neutron-retarding material is made with alternating projections and depressions facing the layer of a neutron-absorbing material.

24 Claims, 5 Drawing Figures

APPARATUS FOR STORING AND PROCESSING FISSIONABLE SUBSTANCES

The present invention relates to chemical equipment, and more specifically, to apparatus for storing and processing fissionable substances, which apparatus may be used in radiochemical plants for processing fissionable substances, viz. uranium and plutonium.

Known in the art are apparatus for storing and processing fissionable substances, provides with a protective shield composed of a layer of material capable of absorbing neutrons, mounted in a direct proximity to a vessel with the fissionable substance, followed by a layer of a neutron-retarding material.

In such apparatus the layer of neutron-retarding material has a flat surface adjacent to the neutron-absorbing layer. Since such a shield reflects a considerable part of neutrons back into the vessel containing the fissionable substance, the thickness of the vessel should be chosen equal to 60 mm.

It is an object of the present invention to provide an apparatus for storing and processing fissionable substances which would make it possible to minimize the neutron-reflection effect and increase, thereby, the permissible thickness of the apparatus vessel.

This object is accomplished by that in an apparatus for storing and processing fissionable substances provided with a protective shield in the form of a layer of a neutron-absorbing material located in a direct proximity to a vessel with a fissionable substance contained therein and followed by a layer of neutron-retarding material, the layer of such neutron-retarding material, according to the present invention, has alternating projections and depressions facing the layer of the neutron-absorbing material.

It is advisable that said projections and depressions have rectangular shape, the width of each projection being of from ⅛ to 3 lengths of neutron migration.

It is advantageous that said depressions be filled with a porous material in order to prevent them from dangerous filling with water.

Cavities defined by the walls of the projections may be partly filled with a heat-transfer medium.

Neutron radiation detectors may be advantageously placed in the depressions for controlling the technological process.

It is desirable that one of the walls of the vessel containing a fissionable substance and the layer of a neutron-absorbing material be performed, and the depressions be communicated with the environment so that some components of fissionable substances could be evacuated through said perforations.

This embodiment of an apparatus for storing and processing fissionable substances in accordance with the invention makes it possible to substantially (by 20 to 30 mm.) increase the thickness of the apparatus vessel.

The invention is further explained by means of specific examples of its embodiment in conjunction with the accompanying drawings, wherein.

Figure 1:
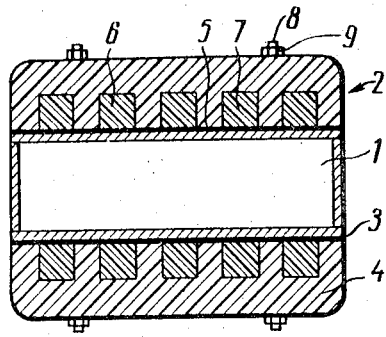
FIG. 1 is a cross-sectional view of the apparatus according to the present invention adapted for storing and processing fissionable substances.

The apparatus for storing and processing fissionable substances according to the present invention comprises a metal vessel 1 (FIG. 1) in the form of an elongated rectangular parallelepiped accommodating a fissionable substance, viz. uranium (not shown). As the fissionable substance use may be made of plutonium. The vessel 1 has, at big faces thereof, a protective shield 2 of rectangular shape. This shield consists of a layer 3 of a neutron-absorbing material in a direct proximity to the vessel 1 (in this embodiment the layer 3 is adjacent to the big faces of the vessel) and a layer 4 of a neutron-retarding material following the layer 3.

The layer 4 of a neutron-retarding material is embodied so as to have alternating projections 5 and depressions 6 facing the layer 3 of a neutron-absorbing material.

As the material for the neutron-absorbing layer 3 use is made of boron. However, cadmium and rare-earth elements may be employed as well. As the material of the neutron-retarding layer 4 a hydrogen-containing retarder is preferably employed such as polyethylene which imparts sufficient rigidity to the entire structure.

The projections 5 and depressions 6 are of rectangular shape. The width of each projections 5 is from ⅛ to 3 lengths of neutron migration, heretogeneous effect, hence playing an importance role in the neutron propagation. More specifically, in the case of polyethylene, migration length is 5 cm and, hence, the width of the projections 5 is five-eighths cm. To avoid the effect of local critical masses, it is advisable that the projections should be tapered. The recesses 6 are filled with a porous material 7 which, in this embodiment, is foamed plastic.

The shield 2 is secured to the vessel 1 by means of bolts 8 and nuts 9.

Figure 2:
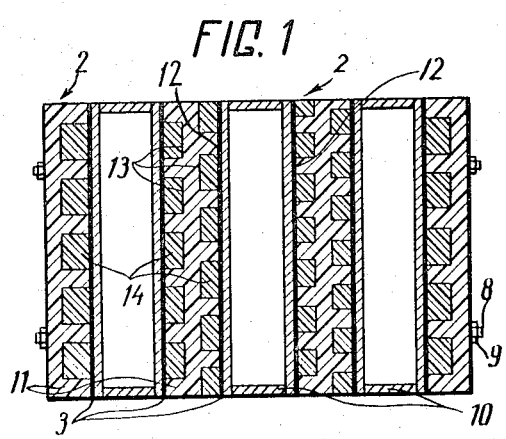
FIG. 2 is an embodiment of the apparatus according to the present invention consisting of several sections (cross-sectional view)

Described hereinabove is an embodiment of the apparatus according to the present invention consisting of a single section. Such apparatus, however, may comprise a plurality of sections. One of such three-section structures is shown in FIG. 2.

An apparatus of this type comprises vessels 10 for a fissionable substance provided with protective shields 2. The shields 2 located between the vessels 10 have a layer 11 of a neutron-retarding material with projections 12 disposed on one side of the shield 2 opposite to depressions 13 on the other side of the shield. The depressions 13 are filled with porous material 14, viz., foamed plastic. The layer 3 of a neutron-absorbing material is embodied in the same manner as in the first version.

In an embodiment of the apparatus employed for processing fissionable substances and involving heating and cooling, the cavities defined by the walls of projections 15 (FIG. 3) are partly filled with a heat-transfer agent. For this purpose, metal pipes 16 are placed within said cavities and water 17 is admitted thereinto. Other structural features of the apparatus are similar to those of the embodiment shown in FIG. 1, namely: 18 is a vessel with a fissionable substance, 2 is a protective shield; 3 is a neutron-absorbing material layer; 19 is a neutron-retarding material layer having projections 15, depressions 20, and porous material 21.

Figure 4:
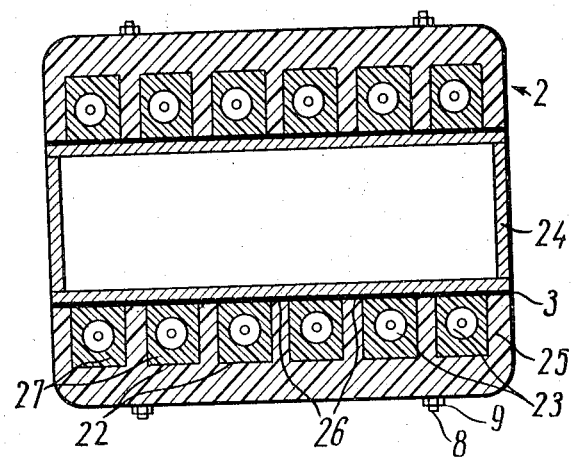
FIG. 4 is an alternative embodiment of the apparatus according to the present invention showing radiation detectors (cross-sectional view)

In an embodiment of the apparatus employed for measuring concentrations of fissionable substances, neutron radiation detectors 23 with helium-3 are mounted within depressions 22 (FIG. 4). Other structural elements of the apparatus are similar to those of the embodiment shown in FIG. 1, namely: 24 is a vessel with fissionable substance, 2 is a protective shield, 3 is a neutron-absorbing material layer, 25 is a neutron-retarding material layer having projections 26, depressions 22 and porous material 27.

In an embodiment of the apparatus employed for depositing fissionable substances and evacuating mother liquor, in one of walls 28 (FIG. 5) of a vessel 29 with a fissionable substance, and in a layer 3 of neutron-absorbing material of a protective shield 2, respective openings 30 and 31 are made. Depressions 32 filled with porous material 34 and located between projections 35 of a neutron-retarding layer 33 communicate with the environment by means of ducts 36, a vessel 37, and a pipe 38 in such a manner as to ensure evacuation of some components of fissionable substances, viz., mother liquor through the openings 30 and 31. The vessel 29 is provided with inlets 39 and 40 for supplying solution and air respectively, while between the wall 28 with the openings 30 and the layer 3 with the openings 31 a clearance 41 is provided.

The layer 3 of a neutron-absorbing material and the layer 4 of a neutron-retarding material disposed against another wall of the vessel 29, as well as depressions 32, projections 35, and vessel 29 are embodied in the same manner as in the apparatus shown in FIG. 1.

The principle of operation of the apparatus for storing and processing fissionable substances according to the present invention is similar for all the above-described embodiments thereof and will be explained in detail for the first embodiment (for other embodiments only some differences in operation will be given).

Neutrons originating and multiplying in the vessel 1 (FIG. 1) containing a fissionable substance, penetrate into the area where the protective shield 2 is located. A part of neutrons is absorbed by the layer 3, while another part passes into the layer 4.

Due to the depressions 6 a considerable part of neutrons is carried into these depressions and only a small part of neutron is reflected by the projections 5. The probability of neutrons returning neutrons back from the depressions 6 is substantially smaller. This effect can be understood by analogy with the socalled "dark windows" effect. If one looks at a building, its windows always seem dark due to the fact that light penetrating inside the premises is considerably absorbed because of multiple light diffusion. In a similar manner "black velvet" effect may be treated, when light is substantially (up to 99 percent) absorbed by the fabric nap.

A similar picture may be obtained with neutrons. In this case, to produce the effect, it is necessary that the size of the projections 5 for neutrons be sufficiently large (for instance, comparable to the length of neutron migration). As a consequence, the amount of neutrons coming back into the vessel with a fissionable substance is very small. This makes it possible to increase safe dimensions of the apparatus so as to meet the nuclear safety requirements. At the same time, the layers 3 and 4 reliably protect the apparatus from neutrons reflected by the walls.

Increasing of the dimensions of the vessel 1 obtainable in the herein-proposed embodiments of the apparatus with the layer 4 of a neutron-retarding material in the form of alternating projections 5 and depressions 6 show that a gain in the dimensions of about 15 mm. on each side of the vessel 1 is attained. In particular, critical stand tests have shown that the thickness of the vessel 1 in apparatus may be made equal to 90 mm. instead of 60 mm. as compared to the known designs of the apparatus. Therefore, the apparatus according to the present invention enables increasing the dimensions of the vessel 1.

In case where the apparatus, due to operation conditions, may be flooded with water, the filling of the depressions 6 with porous material 7 is provided, which prevents water from penetrating into the depressions 6 and thereby eliminates nuclear danger situations.

In the apparatus shown in FIG. 2, as it has been described hereinabove, fissionable substances contained in the vessels 10 interact with each other. To avoid such interaction the depressions 13 of the neutron-retarding layer 11 on one side of the shield 2 are embodied asymmetrically with respect to the depressions 13 on the other side of said shield. Such an embodiment of the apparatus makes it possible to place the vessels 10 at a substantially shorter distance as compared to the known apparatus.

Figure 3:
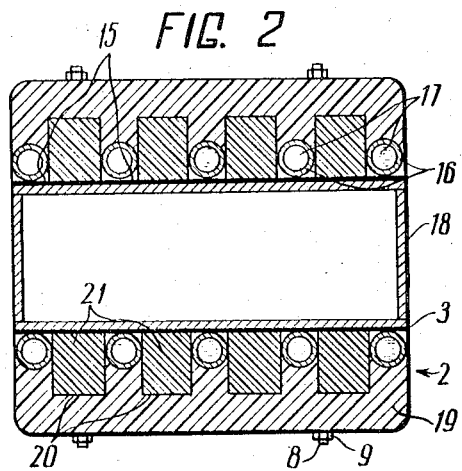
FIG. 3 is another embodiment of the apparatus for storing and processing fissionable substances according to the present invention using a heat-transfer agent (cross-sectional view)

In the apparatus shown in FIG. 3, for carrying out the processing of fissionable substances at high and low temperatures, water 17 is allowed to from along the pipes 16 and fissionable substance contained in the vessel 18 in thus heated or cooled.

In the apparatus shown in FIG. 4 a part of neutrons flying out of the vessel 24 is absorbed by detectors 23 located in the depressions 22. Such an arrangement of the detectors 23 enables determination of the fissionable substance concentration and does not interfere with the nuclear safety conditions. Moreover, a clearance provided between the porous material 27, the layer 25 of a neutron-retarding material, and the walls of the detector 23 contributes to increasing its sensitivity by approximately 1.5 times, since in this case the influence of a decrease in the neutron flux in the vicinity of the detectors 23 is eliminated.

Figure 5:
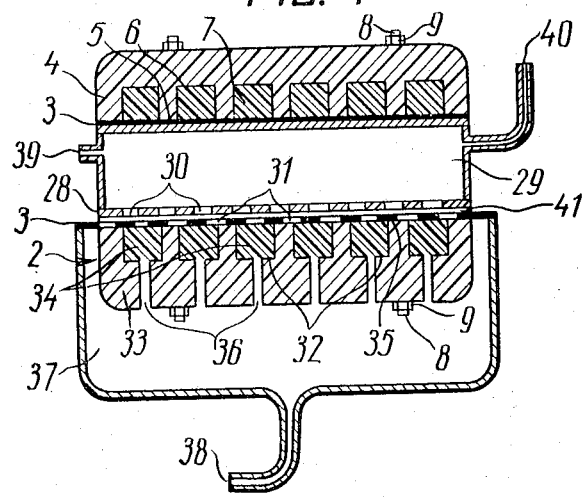
FIG. 5 is still another embodiment of the apparatus according to the present invention with the deposition of fissionable substances and evacuation of mother liquor (cross-sectional view).

In the apparatus shown in FIG. 5, the evacuation of the mother liquor from the vessel 29 is effected through the openings 30, clearance 41, openings 31, the borous material 34 of the depressions 32, pipes 36, chamber 37, and pipe 38. In the vessel 29 there remains the dehydrated residue of fissionable substances.

The apparatus for storing and processing fissionable substances according to the present invention enables an increase in the nuclear-safe dimensions of the vessel by 20 to 30 percent and, in some cases, even higher. This results in a greater productivity of these apparatus, lowers metal consumption, and makes it possible to install, within the same floor space, a greater number of apparatus of the present invention.

We claim:

1. An apparatus for storing and processing fissionable substances comprising a vessel with a fissionable substance contained therein; a protective shield absorbing and retarding neutrons originating and multiplying in said vessel; a layer of neutron-absorbing material of said shield disposed in a direct proximity to said vessel; a layer of neutron-retarding material of said shield disposed adjacent to said layer of the neutron-absorbing material and having alternating projections and depressions facing said layer of the neutron-absorbing material.

2. An apparatus for storing and processing fissionable substances as claimed in claim 1, wherein said projection and depressions are of rectangular shape, the width of each of said projections being of from ⅛ to 3 lengths of neutron migration.

3. An apparatus for storing and processing fissionable substances as claimed in claim 1, wherein said depressions are filled with a porous material.

4. An apparatus for storing and processing fissionable substances as claimed in claim 2, wherein said depressions are filled with a porous material.

5. An apparatus for storing and processing fissionable substances as claimed in claim 1, wherein cavaties are formed between said projections and said layer of neutron-absorbing material, said cavities being partly filled with a heat-transfer medium.

6. An apparatus for storing and processing fissionable substances as claimed in claim 2, wherein cavities are formed between said projections and said layer of neutron-absorbing material, said cavities being at least partly filled with a heat-transfer medium.

7. An apparatus for storing and processing fissioable substances as claimed in claim 3, wherein cavities are formed between said projections and said layer of neutron-absorbing material, said cavities being at least partly filled with a heat-transfer medium.

8. An apparatus for storing and processing fissionable substances as claimed in claim 4, wherein cavities are formed between said projections and said layer of neutron-absorbing material, said cavities being at least partly filled with a heat-transfer medium.

9. An apparatus for storing and processing fissionable substances as claimed in claim 1, wherein neutron radiation detectors are located in said depressions.

10. An apparatus for storing and processing fissionable substances, as claimed in claim 2, wherein neutron radiation detectors are located in said depressions.

11. An apparatus for storing and processing fissionable substances as claimed in claim 3, wherein neutron radiation detectors are located in said porous material.

12. An apparatus for storing and processing fissionable substances as claimed in claim 4, wherein neutron radiation detectors are located in said porous material.

13. An apparatus for storing and processing fissionable substances as claimed in claim 5, wherein neutron radiation detectors are located in said depressions.

14. An apparatus for storing and processing fissionable substances as claimed in claim 6, wherein neutron radiation detectors are located in said depressions.

15. An apparatus for storing and processing fissionable substances as claimed in claim 7, wherein neutron radiation detectors are located in said porous material.

16. An apparatus for storing and processing fissionable substances as claimed in claim 8, wherein neutron radiation detectors are located in said porous material.

17. An apparatus for storing and processing fissionable substances as claimed in claim 1, wherein perforations are formed in one of the walls of said vessel with said fissionable substance contained therein and in said layer of the neutron-absorbing material; said perforations communicating with the environment so as to provide for evacuation of some components of said fissionable substances through said perforations.

18. An apparatus for storing and processing fissionable substances as claimed in claim 2, wherein perforations are formed in one of the walls of said vessel with said fissionable substance contained therein and in said layer of the neutron-absorbing material; said perforations communicating with the environment so as to provide for evacuation of some components of said fissionable substances through said perforations.

19. An apparatus for storing and processing fissionable substances as claimed in claim 3, wherein perforations are formed in one of the walls of said vessel with said fissionable substance contained therein and in said layer of said neutron-absorbing material; said perforations communicating with the environment so as to provide for evacuation of some components of said fissionable substances through said perforations.

20. An apparatus for storing and processing fissionable substances as claimed in claim 4, wherein perforations are formed in one of the walls of said vessel with said fissionable substance contained therein and in said layer of said neutron-absorbing material; said perforations communicating with the environment so as to provide for evacuation of some components of said fissionable substances through said perforations.

21. An apparatus for storing and processing fissionable substances, comprising a container with said fissionable substance; a protective shield for absorbing and retarding neutrons originating and multiplying in said container; a layer of neutron-absorbing material of said shield spaced by a clearance from said container; a layer of neutron-retarding material of said shield disposed adjacent said layer of neutron-absorbing material and having alternating projections and depressions facing said layer of neutron-absorbing material; first perforations provided in one of the longitudinal walls of said container with said fissionable substance; second perforations provided in said layer of neutron-absorbing material facing said walls having said first perforations, said second perforations partly overlapping said depressions; pipes provided in said layer of neutron-retarding material of said shield and communicating with said depressions; a container for collecting liquor containing some of the components of said fissionable substances, said container being connected by means of said pipes with said depressions so as to ensure the removal of said liquor through said first perforations, said clearance, said second perforations, said depressions and said pipes into said container; means for supplying an initial solution and air into said container with said fissionable substance; and means for withdrawing said liquor from said container for collecting said liquor containing some of the components of said fissionable substances.

22. An apparatus for storing and processing fissionable substances as claimed in claim 21, wherein said depressions are filled with a porous material.

23. An apparatus for storing and processing fissionable substances as claimed in claim 21, wherein said projections and said depressions are rectangular in shape, the width of each of said projections being from ⅛ to 3 lengths of neutron migration.

24. An apparatus for storing and processing fissionable substances as claimed in claim 23, wherein said depressions are filled with a porous material.

* * * * *